United States Patent [19]

Paulin

[11] 4,310,748

[45] Jan. 12, 1982

[54] ELECTRIC KETTLE RESERVOIR ASSEMBLY

[75] Inventor: William P. Paulin, Barrie, Canada

[73] Assignee: Canadian General Electric Company Limited, Toronto, Canada

[21] Appl. No.: 198,112

[22] Filed: Oct. 17, 1980

[51] Int. Cl.³ .......................... H05B 1/02; A47J 27/21
[52] U.S. Cl. .................................. 219/437; 219/319;
     219/433; 219/438; 219/523; 428/482; 528/901;
     219/521; 219/541; 219/542
[58] Field of Search ............... 219/319, 429, 432, 433,
     219/437, 438, 439, 441, 521, 523, 541, 542, 544;
     528/901; 428/482

[56] References Cited

U.S. PATENT DOCUMENTS

| | | | |
|---|---|---|---|
| 2,441,941 | 5/1948 | Shafter | 219/433 |
| 2,929,908 | 3/1960 | Parker et al. | 219/437 |
| 3,141,090 | 7/1964 | Batchor | 219/438 |
| 3,218,435 | 11/1965 | Mandziak | 219/437 |
| 3,303,327 | 2/1967 | Himelsbaugh | 219/437 X |
| 3,686,357 | 8/1972 | Cheeseman | 528/901 X |
| 3,715,567 | 2/1972 | Mandziak | 219/437 |
| 3,892,945 | 7/1975 | Lerner | 219/437 |
| 3,931,105 | 1/1976 | Smith | 528/901 X |
| 4,169,185 | 9/1979 | Bathia | 428/482 X |
| 4,248,993 | 2/1981 | Takago | 528/901 X |

FOREIGN PATENT DOCUMENTS

| | | | |
|---|---|---|---|
| 122847 | 12/1946 | Australia | 219/438 |
| 494017 | 6/1953 | Canada | 219/437 |
| 693383 | 9/1964 | Canada | 219/437 |
| 734077 | 5/1966 | Canada | 219/437 |

Primary Examiner—Volodymyr Y. Mayewsky
Attorney, Agent, or Firm—John F. Cullen; George R. Powers; Leonard J. Platt

[57] ABSTRACT

A reservoir for an electric kettle is defined by a dome shaped shell and a planar inner bottom, which are fastened together mechanically having a room temperature vulcanized silicone rubber filler located therebetween to act as a seal. The shell is skirted by an inwardly projecting annular lip and has an inwardly projecting annular shoulder parallel with and spaced from the lip. The inner bottom is bounded by a downwardly extending annular flange, the top edge of which abuts the bead and the bottom edge of which engages the lip. The form of the kettle components permits the interior of the shell to be coated between the lip and shoulder with an annular coating of the silicone rubber whereat the inner bottom is readily snapped into position in the shell during assembly of the kettle.

7 Claims, 4 Drawing Figures

ELECTRIC KETTLE RESERVOIR ASSEMBLY

This invention relates to electric kettles. In particular, it relates to the manner in which the shell and inner bottom of the kettle are assembled.

In electric kettles the inner bottom is attached to the shell so as to form a water reservoir. The sheathed heating element in the reservoir is usually carried by or supported from the inner bottom, and extends through the inner bottom so that electrical connections are made thereto on the outer side. A bottom cover is usually placed over the inner bottom and secured thereto by a screw passing through the cover which is attached to the inner bottom. The electrical cord may pass through the cover or it may be attached to a plug located in the bottom cover. The electrical connections and related components are housed between the inner bottom and cover and provide connection between the heating element and the cord or plug.

In Canadian Pat. No. 494,017 issued June 30, 1953 to Frederic L. Best, a tie bar is employed to tie the inner bottom to the crown of the shell. The tie bar consists of an elongated bolt attached at one of its ends to a bracket formed on the inner bottom and at its other end to an internally threaded sleeve extending through the crown of the shell, which sleeve is accessible from outside the shell. In the preferred embodiment of Best, the shell and inner bottom both have a flange with a rubber gasket sandwiched therebetween. The inner bottom flange has a bead formed by turning an end portion thereof over the shell flange. The shell is also provided with a shoulder at its flange to improve its rigidity. This water-tight joint is not relied upon to secure the inner bottom in position with respect to the shell, as the tie bar is provided to preform this function. It can be appreciated that the use of the tie bar is undesirable due to its presence within the reservoir.

In more recent years, it has been common practice to attach the inner bottom to the shell by means of a solder joint. Such an attachment has usually required the inner bottom to be held in precise location while it is soldered to the shell. The use of a solder joint has the disadvantages of process control problems, requires high energy usage, and is subject to factory environment deterioration. Another disadvantage with the solder joint is that accidental impact against the side of the kettle frequently ruptures the solder joint. Also, in the event that a kettle is accidentally dropped the impact on the outer base cover is transmitted to the inner bottom and together with the water pressure exerts both tensile and shearing stresses on the solder joint which tends to weaken or rupture the joint.

It is therefore an object of the present invention to provide an electrical kettle that has its inner bottom secured to the kettle shell by way of a resilient joint, and in a manner that facilitates ease of assembly and is not subject to the above disadvantages and problems.

Accordingly, this invention comprises a fastening means for an electric kettle that fastens the inner bottom member of the kettle to the kettles shell member. The fastening means includes a lip portion that bounds the shell and projects inwardly of the shell. The fastening means further includes a shoulder portion formed from the shell projecting inwardly adjacent to the lip portion. The fastening means still further includes a flanged skirt portion of the inner member, located between and engaged by the lip and shoulder portions of the shell whereby the inner bottom member is mechanically secured in fixed relation to the shell member. A gasket means is positioned between the inner member and the shell member to ensure a water-tight joint between the shell and inner bottom members.

Additionally, the gasket means may comprise an elastomeric sealing material such as, for example, a room temperature vulcanizing rubber.

The advantage of the above kettle is that during the assembly the shell may be coated or covered with a gasket means between its lip and shoulder portion and the inner plate member simply snapped into place. The mating of the flanged skirt portion of the inner bottom with the shell, between the shoulder and lip portions thereof, provides a mutually supportive system that is very resistant to side impact. Also, the use of an elastomeric sealing material also contributes to impact resistance. In the preferred embodiment the lip portion and shoulder portion are continuous and annular. This provides the maximum strength to the shell and lip portion. Also in the preferred embodiment, the flanged skirt portion is continuous. This provides for a good seal to be formed between the flanged skirt portion and the shell member. It should be understood that the shoulder, lip and flanged skirt portions need not be continuous which may result in the gasket means being positioned in various locations between the inner bottom member and shell member.

Therefore, in accordance with a broad aspect of the present invention there is provided in an electric kettle having a water reservoir defined by a shell member and an inner bottom member, fastening means for securing the inner member in water-tight sealing relation with the shell member comprising, lip means bounding the shell member and projecting inwardly therefrom, shoulder means formed from the shell member, projecting inwardly adjacent to the lip means, flange means of the inner member engaging the lip and shoulder means of the shell whereby the inner member is held in fixed relation to the shell member, and gasket means positioned between the inner member and the shell member.

For a better understanding of the nature and objects of the present invention, reference may be had by way of example to the accompanying drawings in which.

Figure 1:
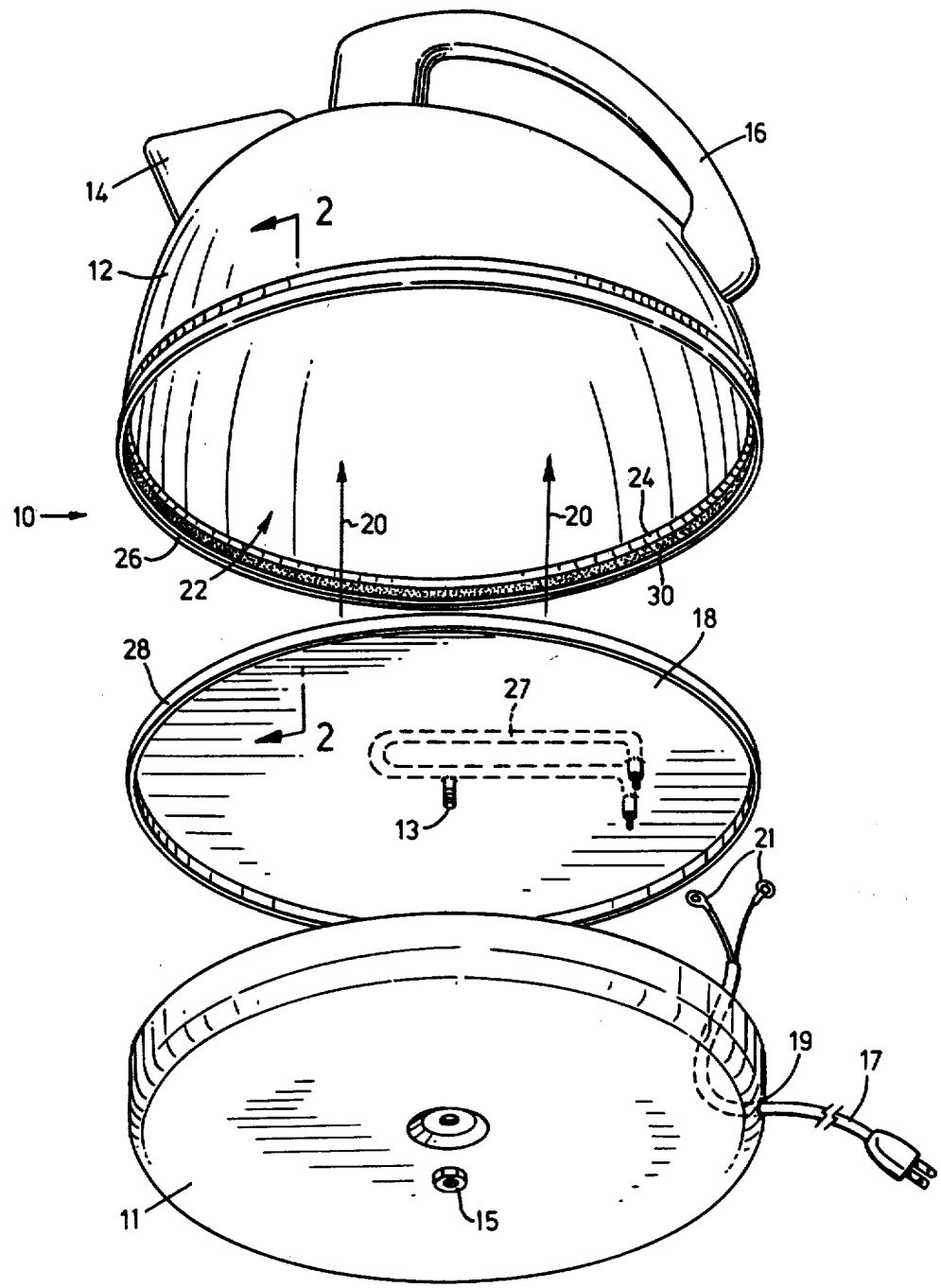
FIG. 1 is an exploded general view of the shell, inner bottom and bottom cover of an electrical kettle as disclosed herein.

Referring now to FIG. 1 there is shown an electric kettle 10 having a dome shaped shell member 12. Shell member 12 is provided with a spout 14 and a handle 16 secured to the shell member 12 in a suitable manner. Also shown in FIG. 1 is a substantially planar inner bottom member 18 which may be inserted into the base of shell 12 in the direction of arrows 20 so as to define a water reservoir 22. A bottom cover 11 is provided to cover the base of shell 12. Inner bottom member 18 has a stud 13 which extends through cover 11 and together with nut 15 secures the bottom cover 11 in fixed relation to shell 12. An electric cord 17 passes through opening 19 in cover 11 and has terminals 21 which are connected via protective electrical circuiting (not shown) housed in cover 11 to the heating element 27.

Figure 2:
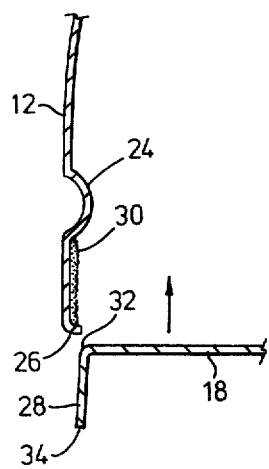
FIG. 2 is a sectional view of the shell and inner bottom at section 2—2 of FIG. 1.
Figure 3:
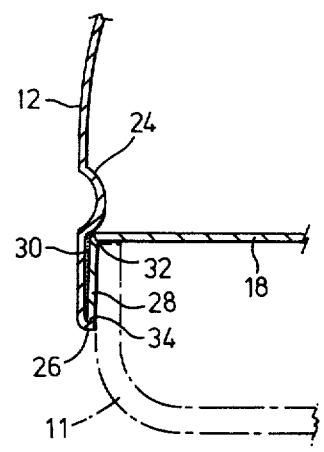
FIG. 3 is a view similar to FIG. 2 showing the inner bottom and shell of the kettle in assembled relation.

Referring now to FIGS. 1 to 3 the fastening means is shown to comprise shoulder means 24, lip means 26, flange means 28 and gasket means 30. The lip means 26 comprises an inturned annular lip portion that bounds the shell member 12. The lip portion 26 is continuous and projects inwardly from the shell member 12. The shoulder means 24 comprises an annular shoulder portion formed from shell member 12, comprising in this preferred embodiment a bead, which projects inwardly adjacent to the lip portion 26. The shoulder portion 24 is continuous. The flange means 28 comprises a downwardly extending flange portion that skirts inner bottom member 18, having an upper corner 32 and a lower edge 34 (FIGS. 2 and 3). Lastly, the gasket means comprises an elastomeric sealing material such as, for example, a room temperature vulcanizing rubber. In the preferred embodiment the room temperature vulcanizing rubber is a silicone rubber.

During the assembly of the shell member 12 and inner plate bottom 18, a room temperature vulcanizing rubber 30 is applied to the annular inner surface of shell member 12 between shoulder portion 24 and lip portion 26. The inner bottom member is then inserted into the base of the shell member 12. Shoulder portion 24 limits the travel of inner bottom member 18 into the shell 12 because the upper corner 32 of flanged skirt portion 28 abuts shoulder portion 24. Also, lip portion 26 prevents the removal of the inner bottom member 18 from shell member 12 since the lower edge 34 of flanged skirt portion 28 engages lip portion 26. The rubber 30, once cured, acts as a seal to form a water-tight joint between inner bottom member 18 and shell member 12. As shown in FIG. 3, rubber 30 is located between flanged skirt portion 28 and shell member 12. Although the room temperature vulcanizing silicone rubber 30 has good bonding properties so as to probably bond the adjoining surfaces, it should be understood that the inner bottom member 18 is mechanically held in fixed relation to the shell member 12 by lip portion 26.

Figure 4:
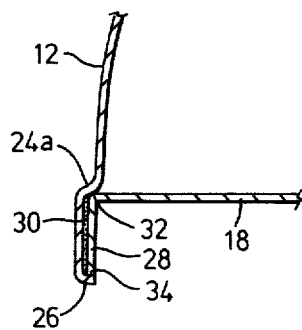
FIG. 4 is a view similar to FIG. 3, showing an alternative shoulder provision on the kettle shell.

One particular alternate embodiment is shown in FIG. 4, wherein the shoulder means comprises an externally projecting shoulder 24A of the shell 12 instead of the bead 24 embodiment shown in FIG. 3.

It should be understood that the foregoing has been a description of the preferred embodiment and that alternate embodiments may be readily apparent to a man skilled in the art. Accordingly, the invention should only be limited to that which is claimed in the accompanying claims.

I claim:

1. An electric kettle having a shell member including a spout and a handle, an inner bottom member for said shell member together defining a water reservoir, a bottom cover for said inner member, an electrical heating element positioned within said water reservoir, an electrical connection for said electrical heating element, and fastening means for securing said inner member in water-tight sealing relation with said shell member comprising lip means bounding said shell member and projecting inwardly therefrom, shoulder means formed from said shell member projecting inwardly adjacent to said lip means, flange means of said bottom member engaging said lip and shoulder means of said shell whereby said inner member is held in fixed relation to said shell member, and gasket means positioned between said inner member and said shell member.

2. The kettle as claimed in claim 1 wherein said gasket means comprises a room temperature vulcanized rubber.

3. The kettle as claimed in claim 2 wherein said rubber is a silicone rubber.

4. The kettle as claimed in claim 1 wherein the flange means includes a corner portion abutting said shoulder means and an edge portion engaging said lip means.

5. An electric kettle having a domed shaped shell member including a spout and a handle, a substantially planar inner bottom member for said shell member together defining a water reservoir, a bottom cover for said inner member, an electrical heating element positioned within said reservoir, an electrical connection for said electrical heating element, and fastening means for securing said inner member in water-tight sealing relation with said shell member comprising, an annular lip portion bounding said shell member and projecting inwardly therefrom, an annular shoulder portion formed from said shell member projecting inwardly adjacent to said lip portion, an annular flanged skirt portion of said inner member located between and engaged by said lip portion and shoulder portions of said shell member whereby said inner member is held in fixed relation to said shell member, and a room temperature vulcanized silicone rubber gasket positioned between said flange portion and said shell portion.

6. The kettle of claim 5 wherein said flanged portion extends downwardly of said inner bottom member and has a lower edge that engages said lip portion and an upper corner portion that abuts said shoulder portion.

7. The kettle of claim 5 wherein said shoulder portion comprises a bead.

* * * * *